(No Model.)
7 Sheets—Sheet 1.
S. D. WARFIELD.
GREEN CORN CUTTER.
No. 316,701. Patented Apr. 28, 1885.
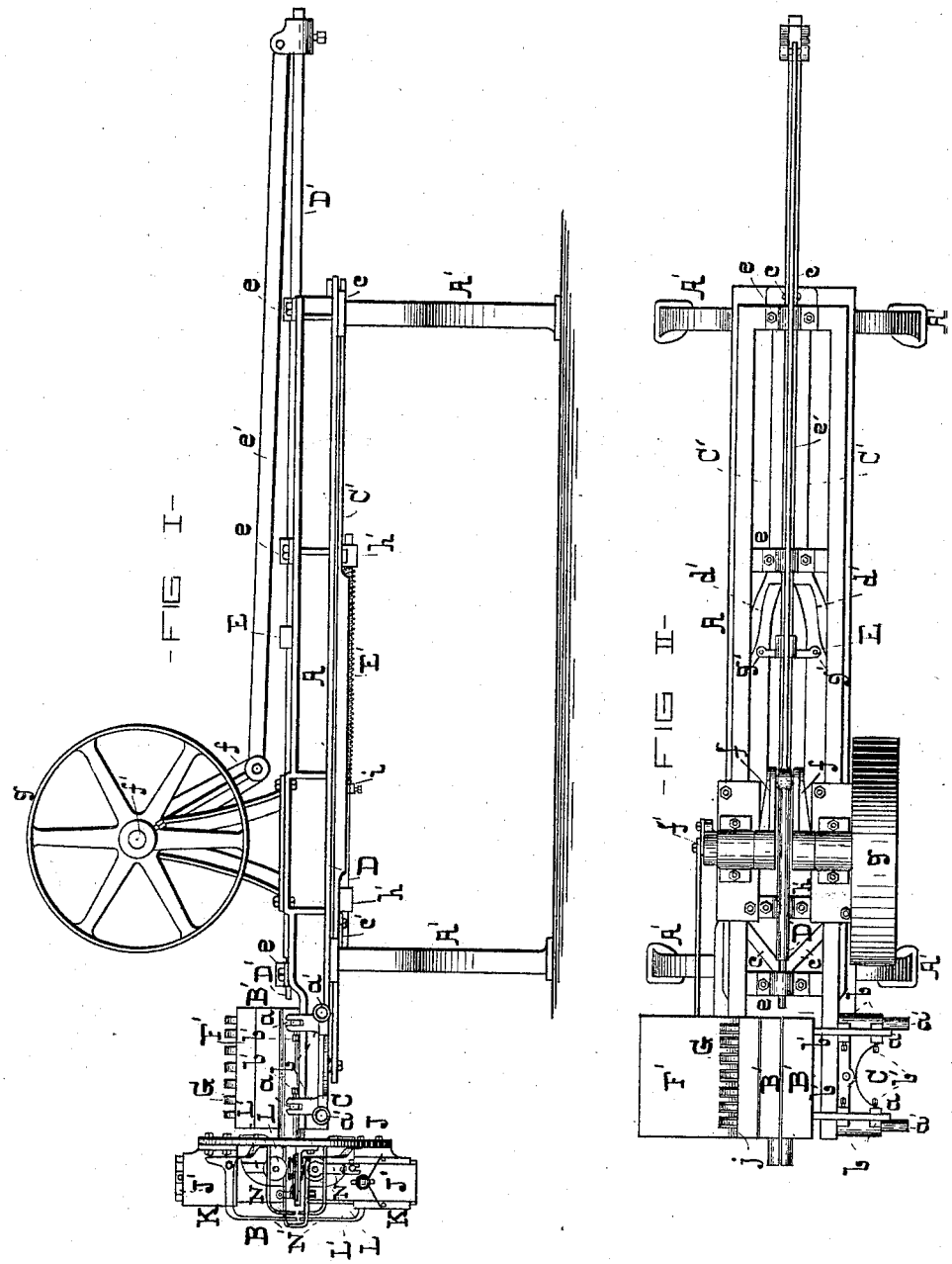
WITNESSES
Danl. Fisher
Chas. N. Arnold.
INVENTOR
Sol. Davies Warfield
by W. T. Howard,
Atty.

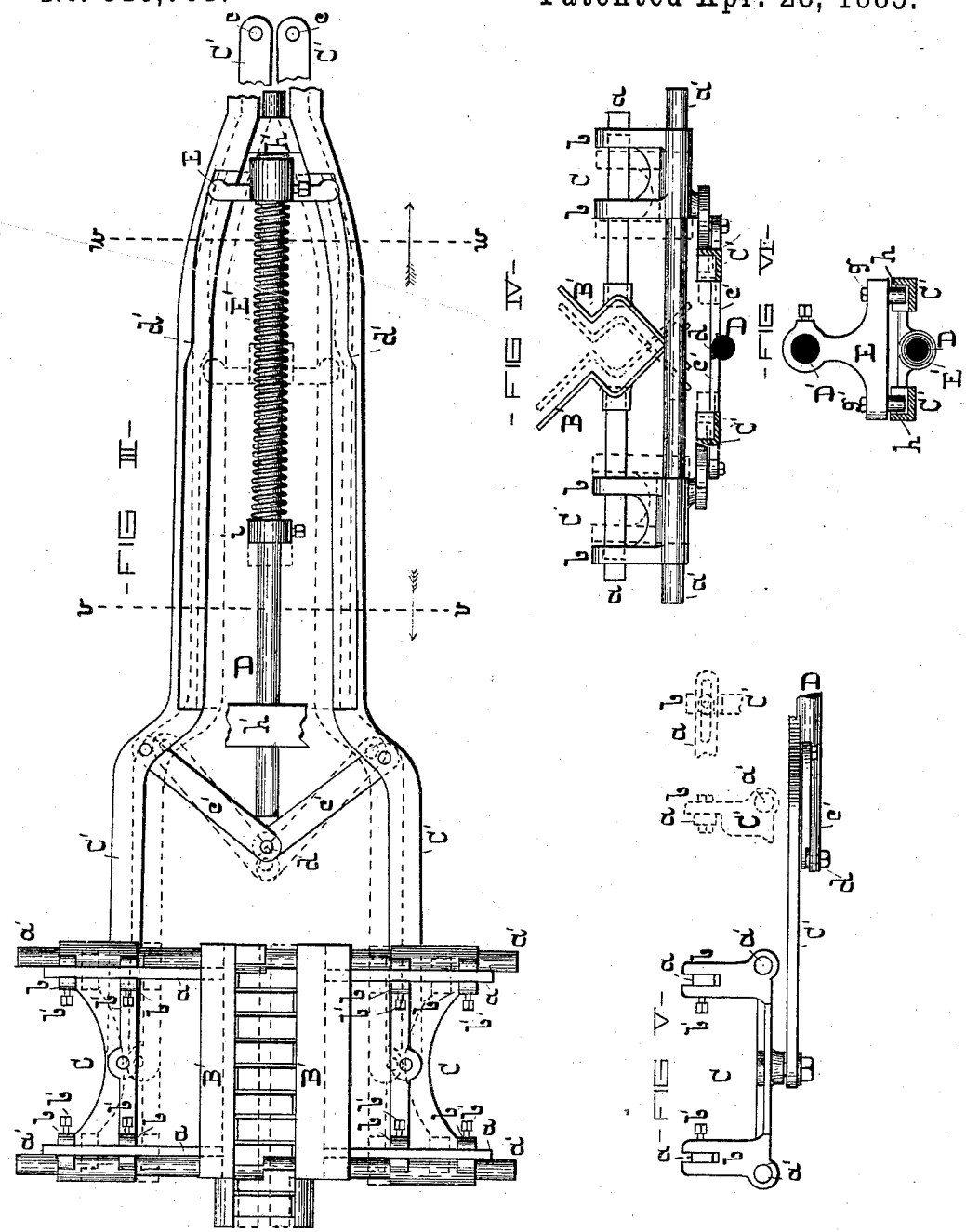

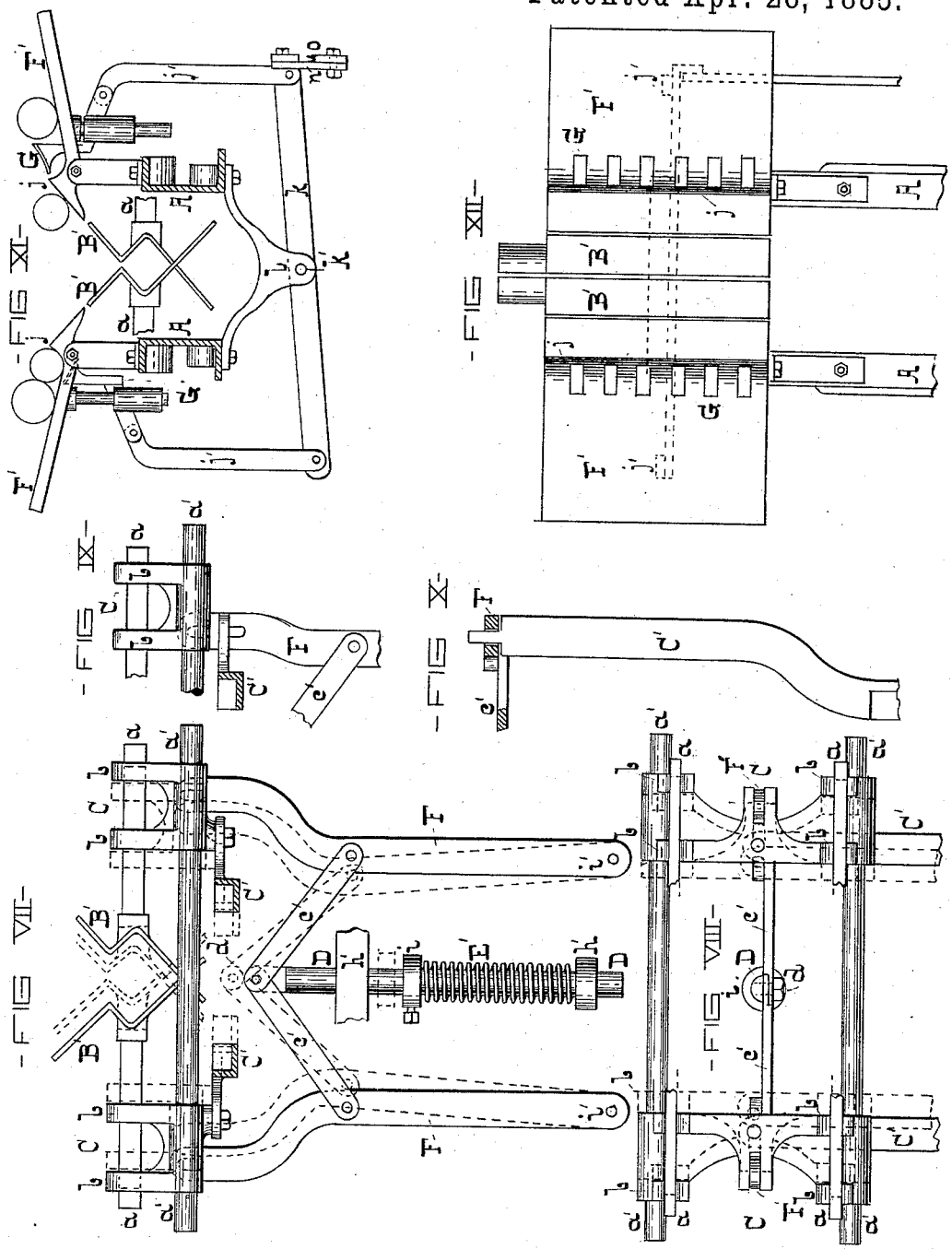

(No Model.)  7 Sheets—Sheet 4.
S. D. WARFIELD.
GREEN CORN CUTTER.
No. 316,701. Patented Apr. 28, 1885.
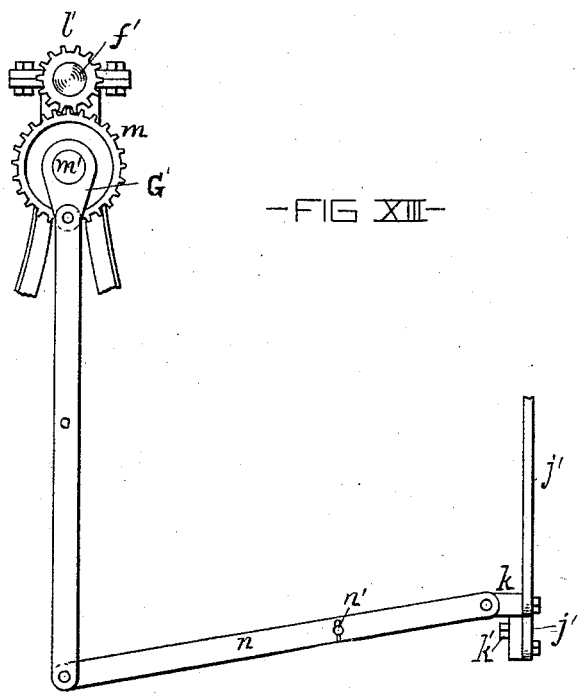
FIG XIII
WITNESSES
H. H. Schott
E. Cruse
INVENTOR
Sol. Davis Warfield
by G. H. W. J. Howard
atty (No Model.) 7 Sheets—Sheet 5.
S. D. WARFIELD.
GREEN CORN CUTTER.
No. 316,701. Patented Apr. 28, 1885.
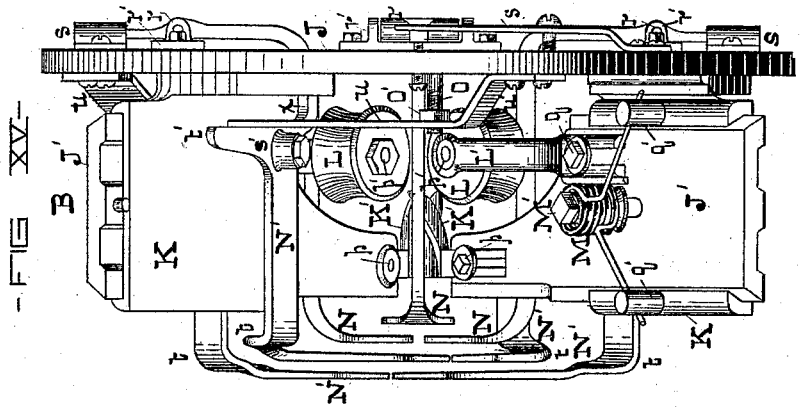
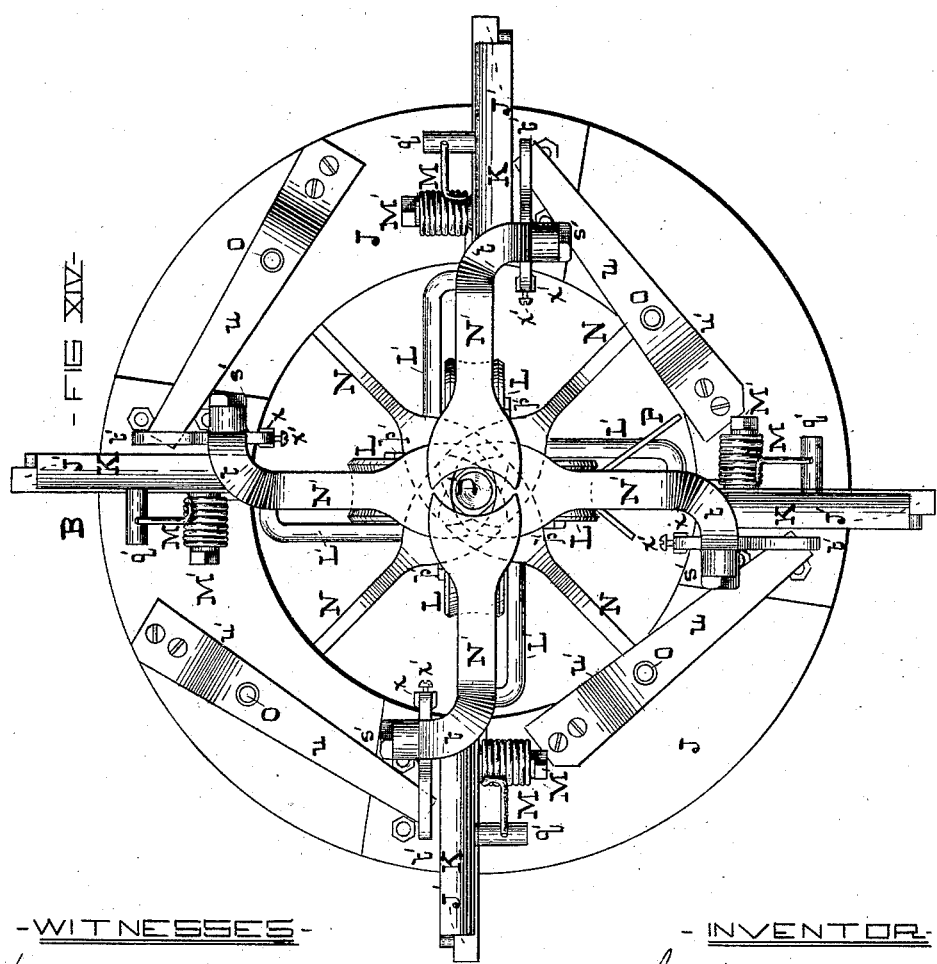
WITNESSES
Danl Fisher
Chas W Arnold
INVENTOR
Sol Davis Warfield
by Geo. W. T. Howard
Attys (No Model.)
S. D. WARFIELD.
GREEN CORN CUTTER.
No. 316,701. Patented Apr. 28, 1885.
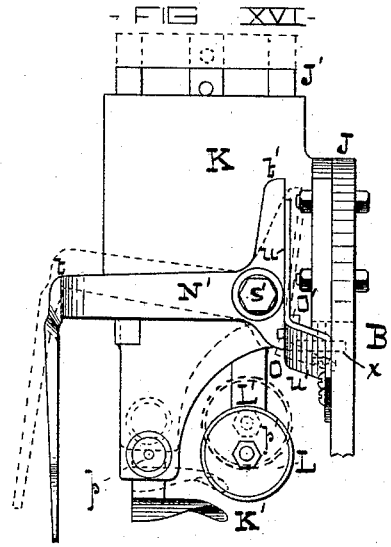
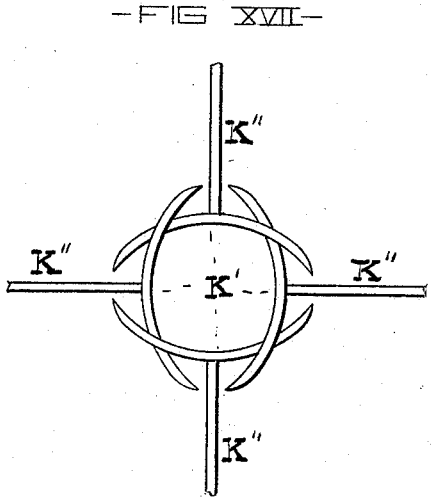
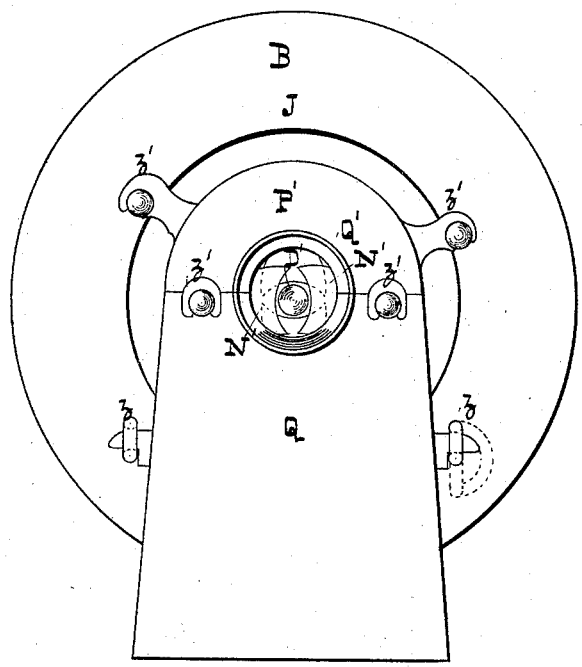
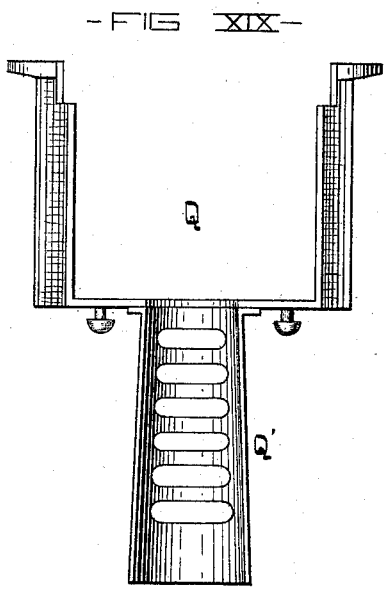
WITNESSES
Danl. Fisher
Chas. W. Arnold
INVENTOR
Sol. Davis Warfield
by Geo. W. T. Howard
Attys.

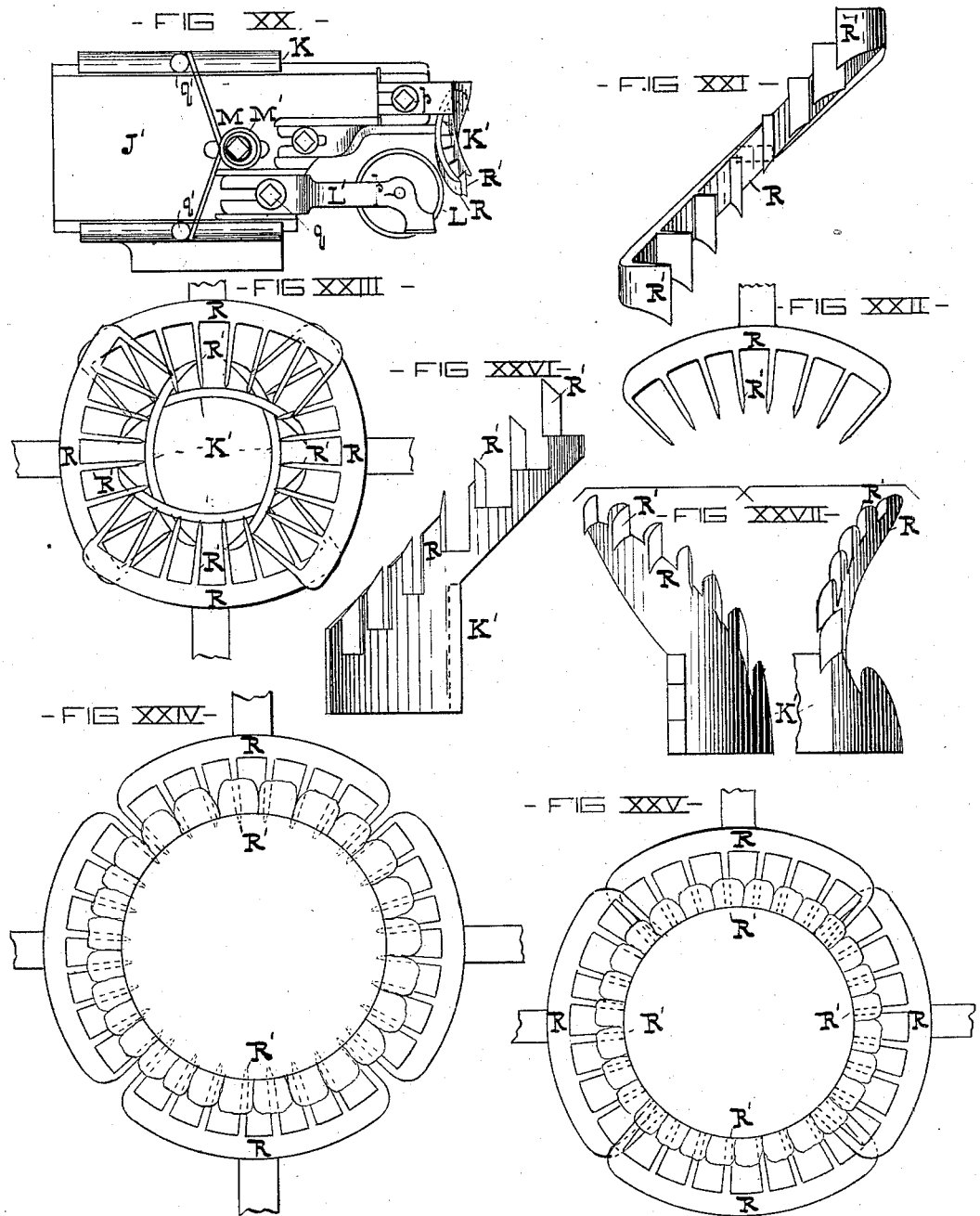

UNITED STATES PATENT OFFICE.

SOLOMON DAVIES WARFIELD, OF BALTIMORE, MARYLAND.

GREEN-CORN CUTTER.

SPECIFICATION forming part of Letters Patent No. 316,701, dated April 28, 1885.

Application filed November 18, 1884. (No model.)

*To all whom it may concern:*

Be it known that I, SOLOMON DAVIES WARFIELD, of the city of Baltimore, and State of Maryland, have invented certain Improvements in Green-Corn Cutters, of which the following is a specification.

This invention relates to certain improvements in that class of green-corn cutters in which the ear is forced through a cutting-head.

In the description of the said invention which follows reference is made to the accompanying drawings, forming a part hereof, and in which—

Figure I is an exterior side view of the improved machine. Fig. II is a plan of Fig. I without the cutting-head. Fig. III is a plan on an enlarged scale of certain parts of the machine, as hereinafter described. Fig. IV is a transverse section of Fig. III, taken on the dotted line $v\ v$ and looking in the direction indicated by the arrow. Fig. V is a view of a part of Fig. III. Fig. VI is a sectional view of Fig. III, taken on the dotted line $w\ w$ and looking in the direction indicated by the arrow. Figs. VII to X, inclusive, represent alternate constructions of certain parts of the machine shown in Figs. III, IV, and V. Figs. XI to XIII, inclusive, illustrate feeding mechanism, hereinafter fully alluded to. Figs. XIV and XV are views of the cutting-head on a much enlarged scale. Fig. XVI is a view of a portion of the cutting-head, also greatly enlarged. Fig. XVII is a view of the cutting-knives on an enlarged scale. Figs. XVIII and XIX are enlarged views of parts of the head of the machine and its attachments, as hereinafter described. Fig. XX shows certain parts of the cutting mechanism. Figs. XXI to XXV, inclusive, show improved knives for splitting the grain. Figs. XXVI and XXVII illustrate modifications in the construction of the splitting-knives.

Referring particularly to Figs. I, II, III, IV, V, and VI, A is the frame of the machine, supported on the legs A'.

B represents the cutting-head, a detailed description of which will hereinafter appear.

The devices whereby the ears are centered, and from which they are forced to the cutting-head by means of a plunger, hereinafter alluded to, consist of a grated clasp in two parts, B' B', which are slotted, so as to interlock at the bottom. The upper portions of the parts B' B' are of such shape as to form a hopper when they are closed, for the reception of the ears to be cut. Each part B' of the clasp is provided with rods $a$, which are supported adjustably by a carriage, C, adapted to slide transversely of the direction of movement of the ear on rods $a'$, which pass through and are rigidly held in the frame A.

To effect the independent adjustment of the two parts B' of the centering-clasp, I provide the carriage C with lugs $b$, which are slotted to receive the rods $a$, and the said lugs have set-screws $b'$, by means of which the said rods are held securely at any position within the range of their movement. By this adjustability the two parts of the clasp can be set in any direction to suit the center of the cutting-head.

To produce the required transverse movement of the carriages C and their attachments, the said carriages are pivoted to levers C', having their fulcra at $c\ c$, at the rear end of the frame A. These levers are coupled by toggle-bars $c'\ c'$, attached together and to a rod, D, at $d$. (See particularly Figs. III, IV, and V.) The levers C' C' have inclined offset surfaces $d'\ d'$, which converge toward their fulcra. D' is a plunger (see Figs. I, II, and VI) adapted to slide in bearings $e$ in the frame A, and which has a longitudinal reciprocating motion through the medium of the connecting-rod $e'$, the cranks $f\ f$, the shaft $f'$, and the pulley $g$. To this plunger is rigidly secured a cross-head, E, having pins $g'$ projecting from its under side, carrying rollers $h$. (See Fig. VI.) In the backward or rearward movement of the plunger D' the rollers $h$ on the cross-head E are forced against the inclined offset surfaces $d'd'$ of the levers C' C', and they are forced apart, and carry with them the carriages C C and the attached parts B' B' of the clasping and centering device. (See Figs. II, III and IV.) In the separation of the levers the toggle-bars $c'\ c'$ are straightened, and in this movement the toggle-rod D, which is confined in bearings $h'\ h'$, (shown in Fig. I,) is forced back, together with the set-collar $i$, adjustably secured thereon.

$E'$ is a spring coiled around the toggle-rod D, and confined endwise between the rear bearing, $h'$, and the set-collar $i$.

In the rear movement of the toggle-rod D, just alluded to, the coiled spring $E'$ is compressed. In the forward or return movement of the plunger D' and the cross-head E, the rollers $h$ on the latter leave the inclined offset surfaces $d'\ d'$ and allow the levers C' to close or come together. This closing of the levers C' is effected by the resilient action of the spring $E'$, which imparts a forward motion to the toggle-rod D and bends the toggle-bars, the outer ends of which are pivoted to the said levers, as before stated. As the levers close, the two parts B' of the clasping and centering device are brought together, thus forming the hopper before alluded to, and centering an ear. The full and dotted delineations, Fig. III, of the levers and their attachments indicate the extremes of their movements.

In Letters Patent No. 304,149, granted to me on the 26th day of August, 1884, for improvements in green-corn cutters, I employ levers similar to those denoted herein by C' C', which have inclined offsets arranged in connection with the rollers on the cross-head, so as to effect both the opening and closing of the said levers and the clasping and centering devices; and as the movement of the clasping and centering devices, if effected entirely by the motion of the said levers, which is positive, would not center and clasp ears of all sizes, I in that patent, connect the said centering device yieldingly to the levers. This construction does not produce accurate centering of the ears, in view of the movement of the two parts of the centering device being independent. It was also found in the practical operation of the invention described in the said patent that the closing of the centering device by the direct action of the cross-head on the inclined offsets was too sudden, producing a slamming together of the two parts of the clasping device, which had the effect of bruising the ears. To obviate this and insure absolute accuracy of centering, I now employ the toggle-bars and their attachments, as described, which close the centering device independently of the cross-head and by a movement which preserves under all circumstances a common center and a regular action. It will be seen, further, that the spring $E'$, when placed on the toggle-rod D, takes the place of the series of springs shown in the said patent, and admits of the clasping and centering of ears of all sizes.

In Figs. VII and VIII are shown the clasping and centering device attached to the levers C'; but the toggle-bars and their attachments are not connected to the said levers, as shown in Figs. IV and V, but to independent levers F, pivoted at $i'$ to some stationary point. The levers F are of course slotted where united to the carriages, to allow of their vibratory motion.

In Figs. IX and X the levers C' are shown as connected to the levers F, instead of to the carriages C.

Other modifications involving the principle of closing the clasping and centering device by means of toggles may be arranged, and consequently I do not wish to be restricted to the combinations herein shown and described.

In Letters Patent No. 310,000, granted to me on the 30th day of December, 1884, for intermittent feed mechanism for green-corn cutters, I show and describe substantially the same feeding devices as those illustrated in Figs. I and II, which, briefly stated, consist in an inclined slotted table, F', for the ears, having a raised stationary stop, $j$, at its lower end, and a vertically-reciprocating lifter, G, adapted to pass through the slotted table F' and to lift the ears from the same, one by one, over the said stop and discharge them to the hopper, forming a part of the clasping and centering device of the machine. One side of this hopper is lower than the other, to bring the discharge as near as possible to the center of the machine.

In Figs. XI and XII inclined feed-tables, similar to those described in the said Letters Patent, are arranged for use on both sides of the feed-hopper, and adapted to alternately discharge the ears one by one to the machine. To admit of this alternate action of the feed mechanism, the lifters G are united to pivoted levers $j'$, which are attached to a rocker, $k$, having its fulcrum at $k'$ on a bracket, $l$, bolted immediately under the center of the frame A. The movement of the rocker $k$ is obtained from the main driving-shaft $f'$ of the machine through the medium of the gear-wheels $l'$ and $m$. (Shown particularly in Fig. XIII.) The gear-wheel $l'$, which is one-half the diameter of the other, $m$, is secured on the driving-shaft $f'$, while the one $m$ is fastened to an independent shaft, $m'$, sustained by a bracket forming a part of the frame A. (Shown in Fig. XIII.) The rocker $k$ is connected at one end to a lever, $n$, having its fulcrum at $n'$ in some stationary part of the machine. The other end of the lever $n$ is attached by a connecting-rod, $o$, to a crank, G', on the shaft $m'$. With this arrangement of devices, at each revolution of the shaft $f'$ an ear of corn is fed to the machine, and alternately from the right and left feed-table.

The cutting-head, which I will now describe, is in some respects similar to the one shown and described in Letters Patent No. 281,588, granted to me on the 17th day of July, 1883, for green-corn cutters, and also that shown and described in Letters Patent No. 304,149, before alluded to.

Referring particularly to Figs. XIV and XV, which are respectively a rear and a side view of the head, J is an annular plate adapted to be secured in any suitable manner to the end of the frame A, with its center on a line with that of the plunger D'.

J' J' are knife-plates with beveled edges, adapted to fit and slide in holders K, which are radially placed and bolted equidistant apart on the outer face of the annular plate J.

K' K' are the knives, which consist of pieces of sheet-steel bent so that their shanks K'' occupy radial positions with reference to the center from which the curved cutting-edge is struck. The cutting-edges of the knives are angular with reference to the line of movement of the ear forced toward them, (see Figs. XV and XVI,) whereby they are extended without increasing the circumferential length, thus giving what is termed a "long drawing" cut. The knives are so formed and relatively placed as to interlock with each other—that is to say, one knife overlaps another—as shown in Fig. XVII. The shanks of the knives are slotted and accurately fit recesses in the knife-plates, and are held securely in their position by means of tap-bolts $p$, which have collars and pass through the slots. These slots extend to the end of the shanks and the knives can therefore be removed by merely slackening the tap-bolts.

L L are gaging-rollers adapted to revolve on pins $p'$ at the ends of the brackets L', held to the knife-plates by means of tap-bolts $q$, which pass through slots to admit of the rollers being radially adjusted to suit the cutting-edges of the knives and regulate the depth of cut.

M M are coiled springs which encircle pins M', held adjustably in slots in the knife-plates, and with their ends resting against fixed pins $q'$ on the knife-plate holders.

For a full description of the pins M' and $q'$ and the springs M and their uses, reference should be had to Letters Patent No. 304,149, before referred to.

N N are scrapers pivoted at $r$ to brackets $r'$, bolted on the inner face of the annular plate J. These scrapers, which are four in number, and their springs $s$ are also described in Letters Patent No. 304,149, before referred to. In connection with the scrapers just described, I use the ones N', which consist of levers hinged at $s'$ to the knife-plate holders, and bent at a point, $t$, above the holders so as to bring their scraping ends radially of the center of the plate J. These scrapers have their scraping-blades situated exteriorly of the scrapers N, as shown in Figs. XIV and XV, and the opposing scrapers, forming one pair, overlap the other ones, which constitute the other pair, as shown in Figs. XIV and XV. The inner ends of the scrapers N' have feet $t'$, which rest on springs $u$, screwed to the annular plate J. These springs are offset at $u'$ and have holes in which the ends of standards O, screwed into the plate J, enter. Nuts O' on the standards O are brought in contact with the springs $u$ to alter their tension.

Stops $x$ on the scrapers N', in connection with the screws $x'$ therein, (see Figs. XIV and XV,) are used to set their scraping-edges at any desired distance from the center of the cutting-head. The extreme positions of one knife-plate and its attachments and one of the scrapers N' are shown by their full and dotted delineations in Fig. XVI. These scrapers possess the same advantages claimed for the ones N described in Letters Patent No. 304,149, before referred to.

P is an inverted-V-shaped guard, slotted so as to admit of its being fastened over the knife-plate, which is immediately beneath the plunger D'. This guard deflects the falling grain from the knife-plate and prevents clogging of the moving parts of the same.

Fig. XVIII is a rear view of the annular plate J, a hood, P', and a chute, Q, to prevent scattering of the grain and to separate the corn from the cob, which latter is discharged through a spout, Q'. All other parts and connections of the head are omitted from this figure. Fig. XIX is a top view of the chute and spout without the annular plate.

Similar devices to the hood and chute are shown in Letters Patent No. 304,149, before referred to. The chute Q is formed, as shown, of any suitable material, and secured to the annular plate J by means of clasps $z$, and carries the lower half of the cob-spout Q'. The hood P', which carries the other half of the cob-spout, fits over the chute and is held to the said chute and the annular plate J by means of buttons $z'$. The lower half of the spout Q' is slotted, as shown, through which slots grain entering the spout may escape, thus preventing its discharge with the cob.

In Fig. XX is shown a knife-plate and its attachments, and a splitting-knife, R, with a number of blades, R', secured thereto. The splitting-knife is set so that the blades are in advance of the cutting-knives, and therefore split the grain before it is removed from the cob.

It will be seen that the blades are arranged obliquely to the line of movement of the ear, and with their cutting-edges parallel therewith. This obliquity of arrangement allows the blades to cut one in advance of another, thereby preventing clogging and mutilation of the grain.

To admit of the setting of the splitting-knife and its adjustment radially of the ear to govern the depth of the cut, its shank is slotted, as shown.

Fig. XXI is an inside view of one of the splitting-knives, and Fig. XXII is a top view of the same.

Fig. XXIII illustrates the manner in which the splitting-knives interlock, and also the position which they occupy with reference to the cutting-knives, which are also shown.

Figs. XXIV and XXV are for the purpose of showing the action of the splitting-knives on different-sized ears. It will be seen that by the interlocking of the splitting-knives attached to the radially-yielding knife-plates, as shown in Figs. XXIII, XXIV, and XXV, that it is impossible for any grain to pass the said knives without being split, no matter what size the ears may be.

Figs. XXVI and XXVII illustrate different methods of forming the splitting-knives.

In Figs. XXI and XXII the blades are formed on the knife, either by casting them in steel or by insertion.

In Fig. XXVI the knife is formed of sheet-steel, with the blades stamped out. In Fig. XXVII the splitting-blades are a portion of the cutting-knives themselves, and are stamped out with them.

In view of the full description of the various parts of the machine and their operation, a thorough description of the operation of cutting corn is unnecessary. Ears of all sizes and shapes are fed to the hopper and automatically transferred from thence to the clasping and centering device, from which they are forced by means of the plunger into and through the cutting-head. At each stroke of the plunger an ear of corn is automatically fed, centered, and cut, and the grain and cob discharged to different receptacles.

While the feeding, clasping, and centering mechanism shown is particularly adapted for the cutting-head described, it is obvious that any or all of them could be applied in machines embodying other cutting devices.

In Fig. V a modification of the parts shown therein is illustrated in dotted lines, the change consisting in dispensing with the set-screws $b'$ and substituting therefor bolts, which pass through the rods $a$.

I claim as my invention—

1. In combination with the cutting-head of a green-corn cutter, a clasping and centering device, in two parts, adapted to have a reciprocating motion radially of the axis of the ear, levers to which the said clasping and centering devices are pivoted, means to open or separate the said levers and their attachments, toggle-bars to connect the said levers, and means, substantially as described, to bend the toggle and maintain its central position, substantially as and for the purpose specified.

2. In combination with the cutting-head of a green-corn cutter, a clasping and centering device, in two parts, adapted to have a reciprocating motion radially of the axis of the ear, levers to which the clasping and centering devices are pivoted, means to open or separate the said levers and their attachments, toggle-bars to connect the said levers, a toggle-rod to bend the toggle-bars and maintain their central position, and a spring to move the said toggle-rod, substantially as and for the purpose specified.

3. In combination with the cutting-head of a green-corn cutter, a clasping and centering device, in two parts, adapted to have a reciprocating motion radially of the axis of the ear, levers having their outer ends connected to the said clasping and centering devices, and having inclined offset surfaces, a moving cross-head with pins which bear against the said offset surfaces to open or separate the said levers, and toggle mechanism to close the same, substantially as and for the purpose specified.

4. A clasping and centering device for a green-corn cutter, in two parts, arranged on either side of the ear, slotted carriages for confining said parts, and means for their adjustment in every direction, combined with means to reciprocate the said carriages to and from the ear, substantially as specified.

5. A clasping and centering device for a green-corn cutter, in two parts, arranged on either side of the ear, the slotted carriages, the levers, and suitable adjusting means to admit of the parts being set in any direction to suit the center of the machine, combined with means to reciprocate the said clasping and centering devices to and from the ear, substantially as specified.

6. In combination with the feeding-hopper of a green-corn cutter, an inclined table for the ears on either side of the said hopper, devices whereby the ears are carried from the table to the hopper, one by one, and means for effecting the alternate action of the said devices, substantially as specified.

7. In a cutting-head for a green-corn cutter, the combination of an annular plate adapted for attachment to the machine, a series of knife-plates carrying knives which are movable radially of the plate, suitable holders for said knife-plates, a series of scrapers the scraping-edges of which are in the rear of the cutting-knives, said scrapers being pivoted to the said holders and having feet, and springs fastened to the rear side of the plate with their movable ends bearing against the said feet, substantially as and for the purpose specified.

8. In combination with the cutting-knives of a green-corn cutter, a series of interlocking splitting-knives secured in advance of the said cutting-knives, substantially as and for the purpose specified.

9. In combination with the cutting-knives of a green-corn cutter, a series of interlocking splitting-knives secured in advance of the said cutting-knives, and means for the radial adjustment of the said splitting-knives, substantially as specified.

10. In combination with the cutting-knives of a green-corn cutter, a series of splitting-knives carrying cutting-blades arranged obliquely to the line of movement of the ear, and with the cutting-edges parallel therewith, substantially as specified.

SOLOMON DAVIES WARFIELD.

Witnesses:
WM. T. HOWARD,
CHAS. W. ARNOLD.